United States Patent
Wimmer et al.

(10) Patent No.: US 10,406,901 B2
(45) Date of Patent: Sep. 10, 2019

(54) WIND DEFLECTOR HAVING A FASTENING SYSTEM FOR AN UNFOLDABLE DEFLECTOR ELEMENT

(71) Applicant: WEBASTO SE, Stockdorf (DE)

(72) Inventors: Rudolf Wimmer, Stockdorf (DE); Moritz Pradella, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/745,768

(22) PCT Filed: Oct. 16, 2015

(86) PCT No.: PCT/EP2015/073992
§ 371 (c)(1),
(2) Date: Jan. 18, 2018

(87) PCT Pub. No.: WO2017/025153
PCT Pub. Date: Feb. 16, 2017

(65) Prior Publication Data
US 2018/0208035 A1    Jul. 26, 2018

(30) Foreign Application Priority Data
Aug. 7, 2015 (DE) .......... 10 2015 113 079

(51) Int. Cl.
*B60J 7/22* (2006.01)
*B29C 39/10* (2006.01)
(Continued)

(52) U.S. Cl.
CPC .......... *B60J 7/22* (2013.01); *B29C 39/10* (2013.01); *B29C 39/30* (2013.01); *B29C 39/021* (2013.01); *B60Y 2410/122* (2013.01)

(58) Field of Classification Search
CPC ........................................ B60J 7/22
(Continued)

(56) References Cited

U.S. PATENT DOCUMENTS

| 2,832,407 A * | 4/1958 | Tracy ................ E06B 9/52 |
| | | 160/371 |
| 8,662,577 B2 * | 3/2014 | Wimmer ............ B60J 7/22 |
| | | 296/217 |

(Continued)

FOREIGN PATENT DOCUMENTS

| CN | 203 623 343 U | 6/2014 |
| DE | 10 2009 021150 A1 | 11/2010 |
| DE | 10 2010 048964 A1 | 4/2012 |

OTHER PUBLICATIONS

International Preliminary Report on Patentability issued against International Application No. PCT/EP2015/073992 dated Feb. 13, 2018.

(Continued)

*Primary Examiner* — Dennis H Pedder
(74) *Attorney, Agent, or Firm* — Fitch, Even, Tabin & Flannery, LLP

(57) ABSTRACT

A wind deflector for a vehicle roof having a displaceable cover element. The wind deflector can have an unfoldable deflector element made of a flat flexible material and whose lower edge portion can be fastened to a vehicle-mounted base via a lower edge strip and whose upper edge portion is fastened to a pivotable deploying bow via an upper edge strip. The lower edge strip and the vehicle-mounted base and/or the upper edge strip and the deploying bow can form a respective fastening system. The fastening system may have a fixing rib on one side and an arrangement of tabs attached to the fixing rib on the other side, the arrangement of tabs being formed by locking tabs and support tabs alternating along the fixing rib, the locking tabs and the support tabs being in contact with the fixing rib on sides facing away from each other.

6 Claims, 16 Drawing Sheets

(51) Int. Cl.
    *B29C 39/30*    (2006.01)
    *B29C 39/02*    (2006.01)

(58) Field of Classification Search
    USPC ....... 296/217; 160/371, 402, 370.21–370.23, 160/269, 382–385, 399, 493, 380; 52/63, 52/222
    See application file for complete search history.

(56) References Cited

U.S. PATENT DOCUMENTS

| | | | |
|---|---|---|---|
| 9,617,784 B2 * | 4/2017 | Houlihan | E06B 9/01 |
| 2013/0193721 A1 | 8/2013 | Wimmer | |

OTHER PUBLICATIONS

International Search Report for PCT/EP2015/073992 dated Apr. 18, 2016 and English translation submitted herewith (5 Pages).

* cited by examiner

WIND DEFLECTOR HAVING A FASTENING SYSTEM FOR AN UNFOLDABLE DEFLECTOR ELEMENT

CROSS-REFERENCE TO RELATED APPLICATIONS

This application is a U.S. national phase application filed under 35 U.S.C. § 371 of International Application No. PCT/EP2015/073992, filed Oct. 16, 2015, designating the United States, which claims priority from German Patent Application No. 102015113079.3, filed Aug. 7, 2015, which are hereby incorporated herein by reference in their entirety for all purposes.

FIELD

The invention relates to a wind deflector for a vehicle roof capable of being opened and having a displaceable cover element, the wind deflector having the features of the preamble of claim 1.

BACKGROUND

A wind deflector of this kind is known from practice and is disposed in the area of a front edge of a roof opening that can be selectively closed or at least partially opened by means of a cover element. For a deflector element, the wind deflector can comprise an unfoldable mesh whose lower edge is connected to a vehicle-mounted base via a lower edge strip, i.e. fixed to the roof, and whose upper edge is connected to a deploying bow via an upper edge strip. The deploying bow is typically U-shaped, and its free brackets, each of which forms an deploying arm, are hinged in a pivotable manner in the area of a respective roof-mounted guide rail for the cover element. As a function of the open position of the cover element, the deploying bow can be pivoted between a pushed-down rest position, in which the deflector element is folded, and a deployed operating position, in which the deflector element is unfolded and forms a surface of incidence for an incoming airflow. The lower edge strip is formed in the manner of a beading and engages into a beading channel of the vehicle-mounted base. The upper edge strip can also be formed in the manner of a beading and engage into a corresponding beading channel of the deploying bow. The lower edge strip and the vehicle-mounted base on one side and the upper edge strip and the deploying bow on the other side thus each form a fastening system for the deflector element.

The known wind deflector described above presents the disadvantage that a fastening geometry is required in particular in the area of the vehicle-mounted base that engages around both sides of the beading-type lower edge strip of the deflector element, which necessitates sufficient installation space in the longitudinal direction of the vehicle and possibly also in the transverse direction of the vehicle. In turn, this installation space diminishes the maximum size of the roof cutout that can be closed by the cover element and thus diminishes the see-through roof portion that can be realized. Furthermore, production of the beading channel with corresponding hooking features is complicated because an injection-molding tool used to produce the vehicle-mounted base will have to be equipped with corresponding scrapers, which additionally make the tool expensive.

The object of the invention is to provide a wind deflector of the kind mentioned above that has a fastening system requiring little installation space for connecting the deflector element to a vehicle-mounted base and/or to a pivotable deploying bow of the wind deflector.

According to the invention, this object is attained by the wind deflector having the features of claim 1.

SUMMARY

Therefore, the invention proposes forming the fastening system for connecting the deflector element to the vehicle-mounted base and/or to the deploying bow out of a fixing rib on one side and of locking and support tabs on the other side which are engaged with the fixing rib in such a manner that, viewed in the longitudinal direction of the rib, a locking tab and a support tab are alternately brought in contact with the fixing rib from sides facing away from each other. The locking tabs at least are locked to the fixing rib. The support tabs, which may also be locked to the fixing rib, are in contact with the fixing rib from the side that faces away from the locking tabs. The fixing rib can be very slim and still have sufficient stability so that only little installation space is required to realize the fastening system composed of the fixing rib and the arrangement of tabs. This allows for a correspondingly large design of the adjacent roof cutout and thus of the see-through portion of the roof.

In a preferred embodiment of the wind deflector according to the invention, the fixing rib is disposed on the vehicle-mounted base and the arrangement of tabs is disposed on the lower edge strip of the deflector element. For example, the vehicle-mounted base is a frame front part of a sliding roof frame or a separate wind deflector tray that is integrated in the respective vehicle roof. During installation of a correspondingly configured wind deflector, the lower edge strip of the unfoldable deflector element that carries the arrangement of tabs is plugged onto the fixing rib of the vehicle-mounted base from above, the locking tabs catching on one side of the fixing rib and the support tabs coming into contact with the other side of the fixing rib and thus forming a counter bearing for the edge strip.

In an alternative embodiment of the wind deflector according to the invention, the lower edge strip of the deflector element is provided with a fixing rib, the arrangement of tabs then being disposed on the vehicle-mounted base. In this case, during installation, the lower edge strip is pushed between the locking tabs and the support tabs of the arrangement of tabs of the vehicle-mounted base and is locked in place.

In a specific embodiment of the wind deflector according to the invention, in order to be able to connect the respective edge strip of the deflector element to the deploying bow and to the vehicle-mounted base in a manner secured against being pulled out, each locking tab has a locking nose that engages into a respective corresponding locking opening of the fixing rib. The locking opening can be a recess of the fixing rib or be formed in the shape of an undercut into which the hook-like locking nose of the respective locking tab engages.

In an alternative embodiment of the wind deflector according to the invention, each locking tab is provided with a locking opening into which a respective corresponding locking nose of the fixing rib engages. In this embodiment, too, the deflector element is connected to the vehicle-mounted base in a manner secured against being pulled out.

In a preferred embodiment, in order for the fastening system composed of the fixing rib and the arrangement of tabs to require particularly little installation space, the fixing rib has seats for the locking tabs and for the support tabs, said seats alternating in the longitudinal direction of the fixing rib. In this case, the locking tabs and the support tabs have a thickness that corresponds to the thickness of the fixing rib, for example. The depth of the seats can correspond to the thickness of the locking tabs and of the support tabs. The total thickness of the fastening systems is thus defined by the thickness of the fixing rib. The width of the edge strip provided with the arrangement of tabs can be designed correspondingly.

To further increase the stability of the fastening system, the support tabs can also each be provided with a locking means that interacts with a corresponding locking element of the fixing rib.

Other advantages and advantageous configurations of the subject-matter of the invention are apparent from the description, the drawing and the claims.

Embodiment examples of a wind deflector according to the invention are illustrated in a schematically simplified manner in the drawing and are explained in more detail in the following description.

BRIEF DESCRIPTIONS OF THE DRAWINGS

Figure 1:
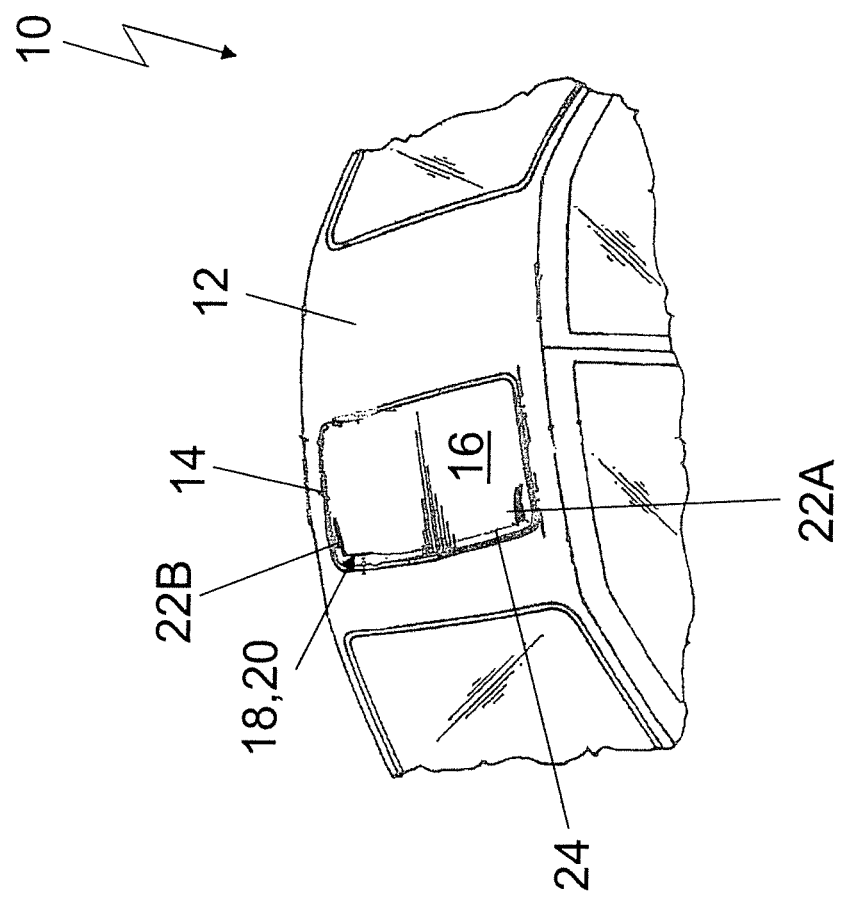
FIG. 1 shows a perspective top view of a vehicle roof having the wind deflector according to the invention.
Figure 2:
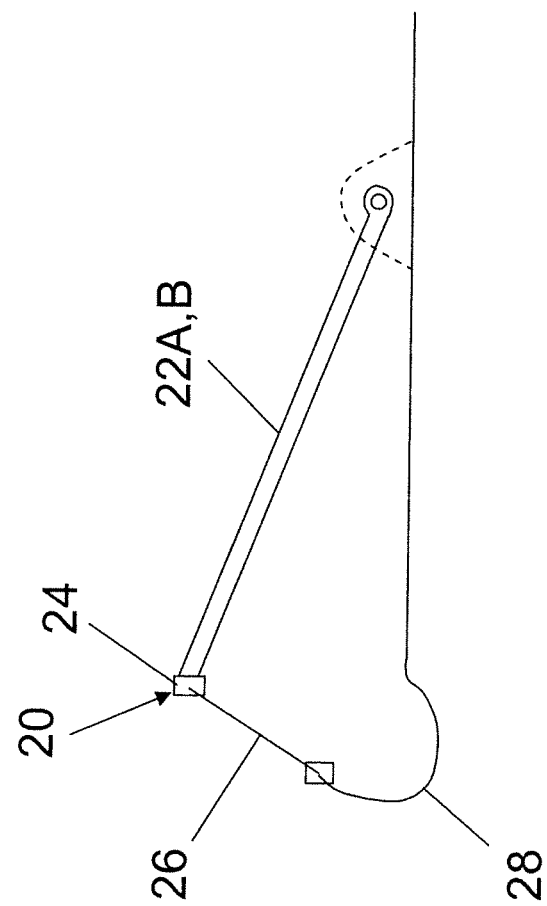
FIG. 2 shows a schematic side view of the wind deflector.
Figure 3:
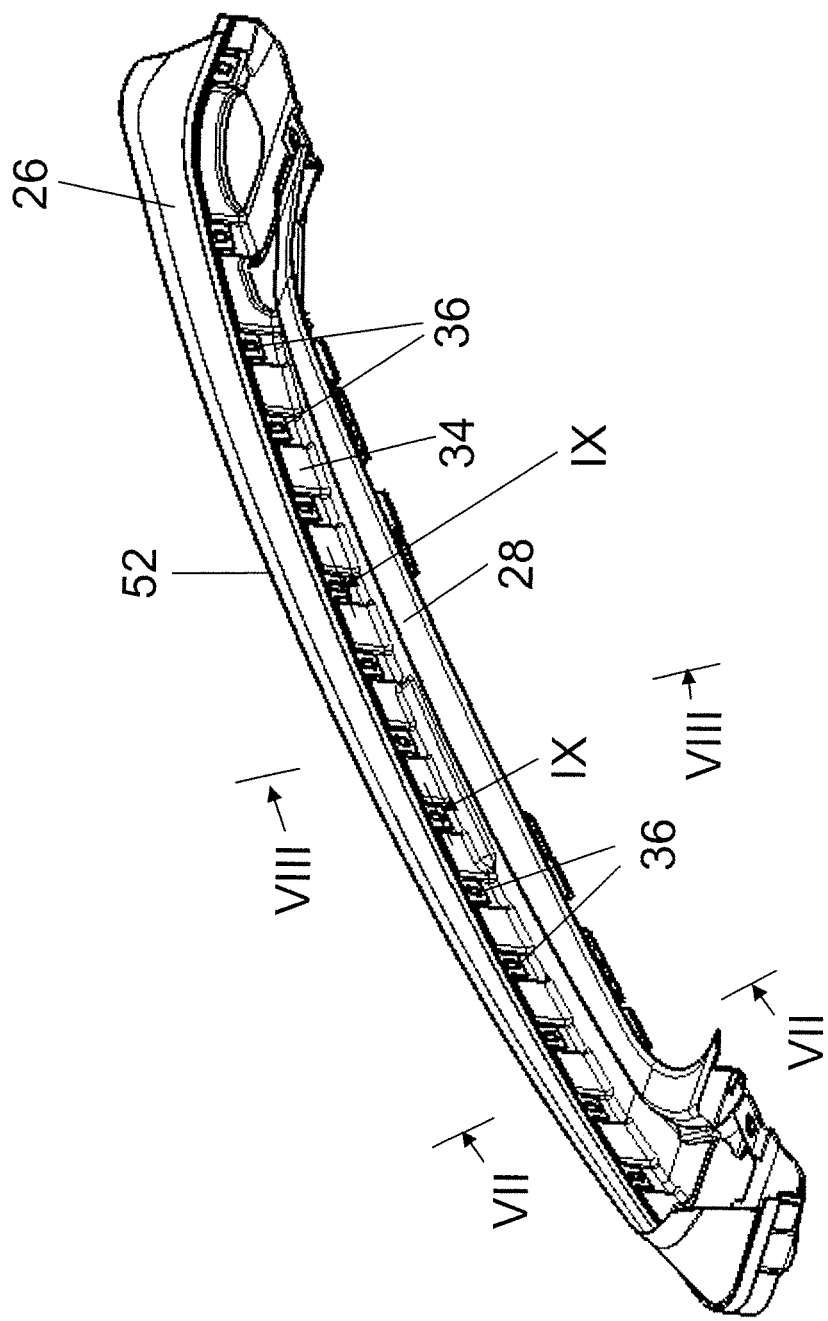
FIG. 3 shows a perspective illustration of a wind deflector tray including a wind deflector mesh fastened thereto.
Figure 4:
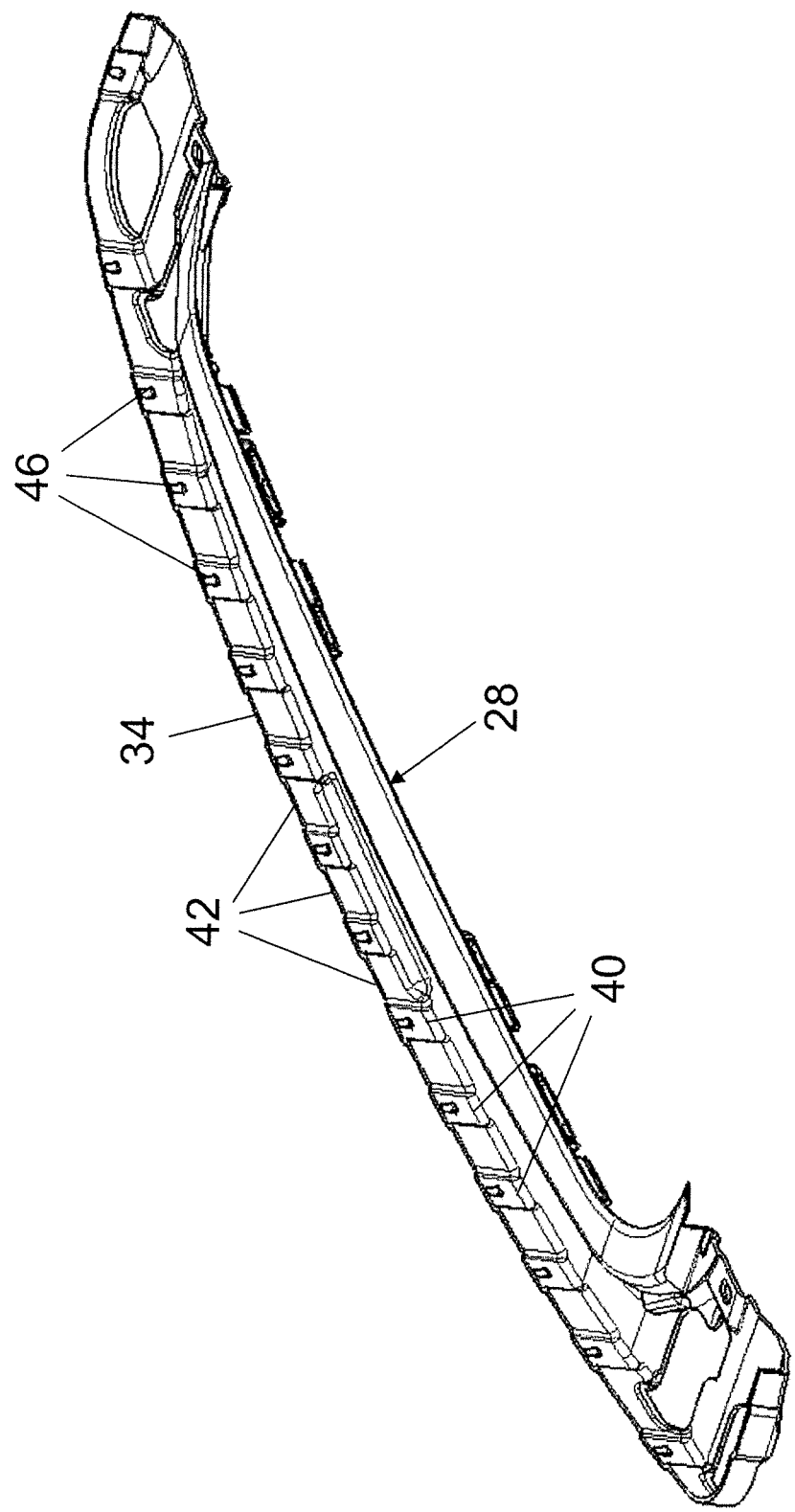
FIG. 4 shows the wind deflector tray in an isolated view.
Figure 5:
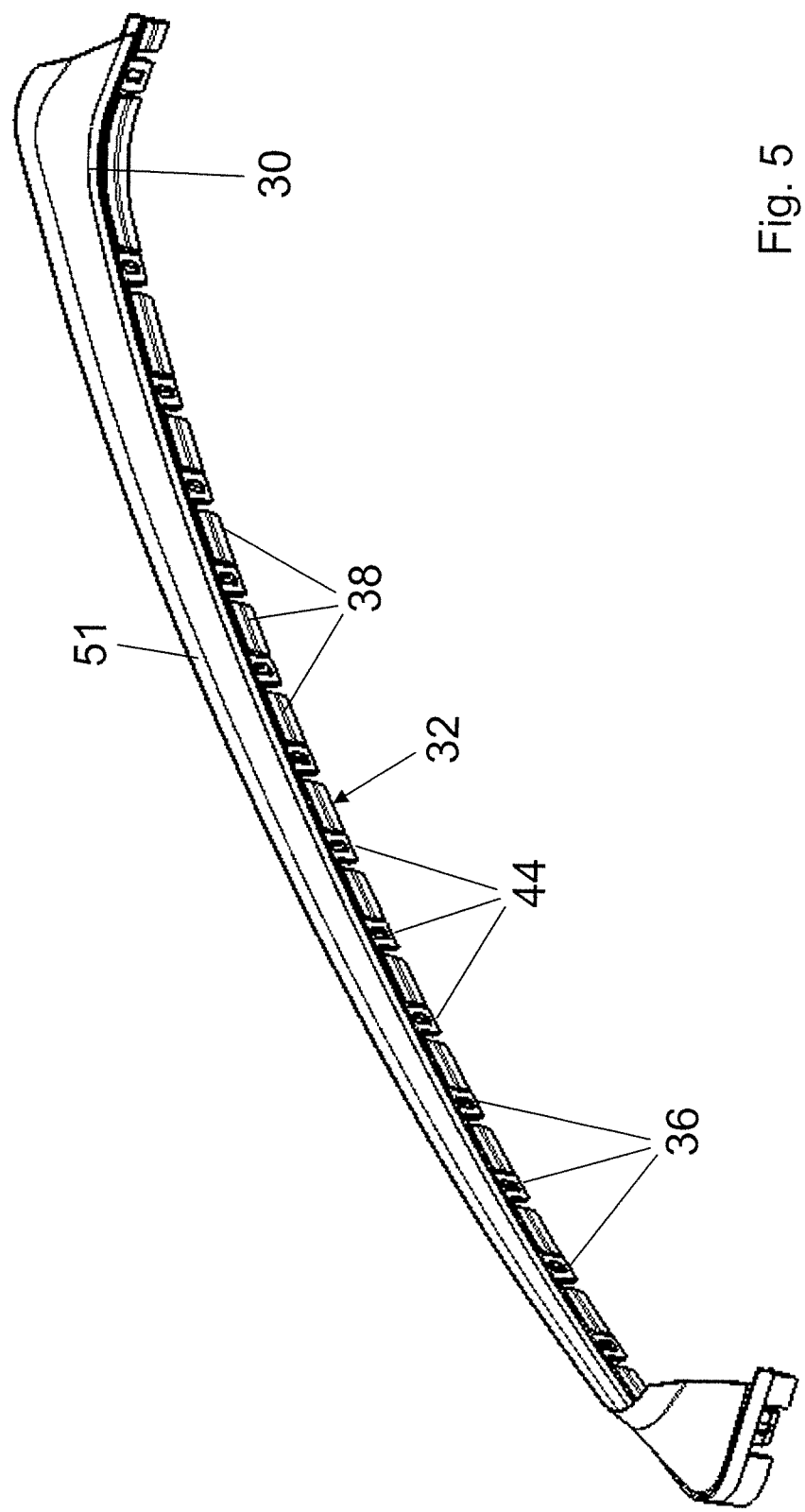
FIG. 5 shows the wind deflector mesh in an isolated view.

FIG. 1 illustrates a motor vehicle 10 that has a vehicle roof 12 provided with a roof cutout 14 that can be selectively closed or at least partially opened by means of a displaceable cover element 16.

Adjacent to a forward or front-side edge portion of the roof cutout 14, a wind deflector 18 is disposed that can be deployed as a function of the position of the cover element 16 and that substantially extends in the transverse direction of the vehicle and that is described in more detail below. The wind deflector 18 serves to prevent the occurrence of potentially bothersome air flows and air turbulences in the vehicle interior when the roof cutout 14 is open, i.e. when the cover element 16 is retracted.

DETAILED DESCRIPTION

The wind deflector 18 comprises an at least approximately U-shaped deploying bow 20 that has two brackets 22A and 22B serving as deploying arms and interconnected by a transverse bracket 24 extending in the transverse direction of the vehicle. The deploying arms 22A and 22B are each pivotably hinged to the vehicle roof 12 in the area of a guide rail (not shown) for the cover element 16, which is made in particular of transparent glass, the guide rail extending in the longitudinal direction of the vehicle. Each deploying arm 22A and 22B is pre-tensioned in the direction of deployment by means of a deploying spring, for example. The degree of deployment of the deploying arms 22A and 22B and thus of the deploying bow 20 is determined by the position of the cover element 16 in the longitudinal direction of the vehicle. This is because the cover element 16 drives onto the deploying alms 22A and 22B from behind when the roof cutout 14 is being closed starting from an open position and pushes them downward against the force of the deploying springs, i.e. into a rest position. When the cover element is being retracted and the roof cutout 14 is being opened, the deploying arms 22A and 22B are released, allowing the deploying bow 20 to automatically pivot out into an active position by the action of the deploying springs.

As can be seen in FIGS. 2 to 9, the wind deflector 18 has a deflector element 26 that consists of a netting or mesh and is thus formed by a flat, flexible and unfoldable material. The deflector element 26 is clamped between the deploying bow 20 and a rigid roof section, which is a vehicle-mounted base of the wind deflector and formed by a separate wind deflector tray 28. The deflector element 26, which is formed by a mesh or netting, is unfolded between the deploying bow 20 and the wind deflector tray 28 when the deploying bow 20 is in the deployed position. When the deploying bow 20 is in the lowered state, the deflector element 26 is disposed in folded shape between the lowered deploying bow 20 and the wind deflector tray 28.

Alternatively, the vehicle-mounted base of the wind deflector 18 can also be formed by a frame front part of a sliding roof frame or by another roof-mounted element of the vehicle roof 12.

The deflector element 26, which is made of a fine-meshed plastic netting, has a lower edge strip 30 that is provided with an arrangement of tabs 32 that, together with a fixing rib 34 of the wind deflector tray 28, forms a fastening system for connecting the deflector element 26 to the wind deflector tray 28. The arrangement of tabs 32 consists of locking tabs 36 and support tabs 38 that are formed alternately along the edge strip 30, which is produced by plastic injection molding, and are integral to the edge strip 30.

Figure 9:
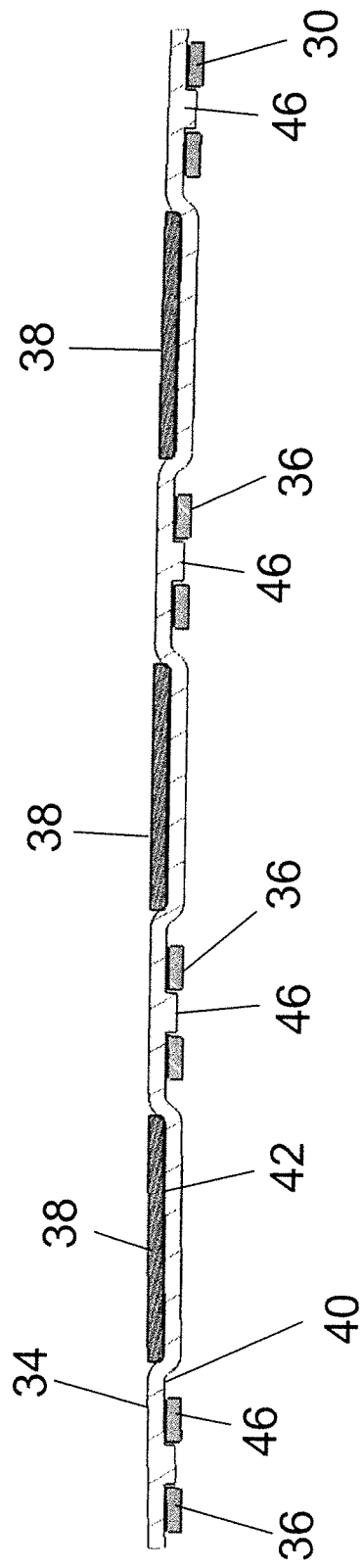
FIG. 9 shows a longitudinal cross-section through the wind deflector tray and a lower edge strip of the wind deflector mesh according to line IX-IX in FIG. 3.
Figure 10:
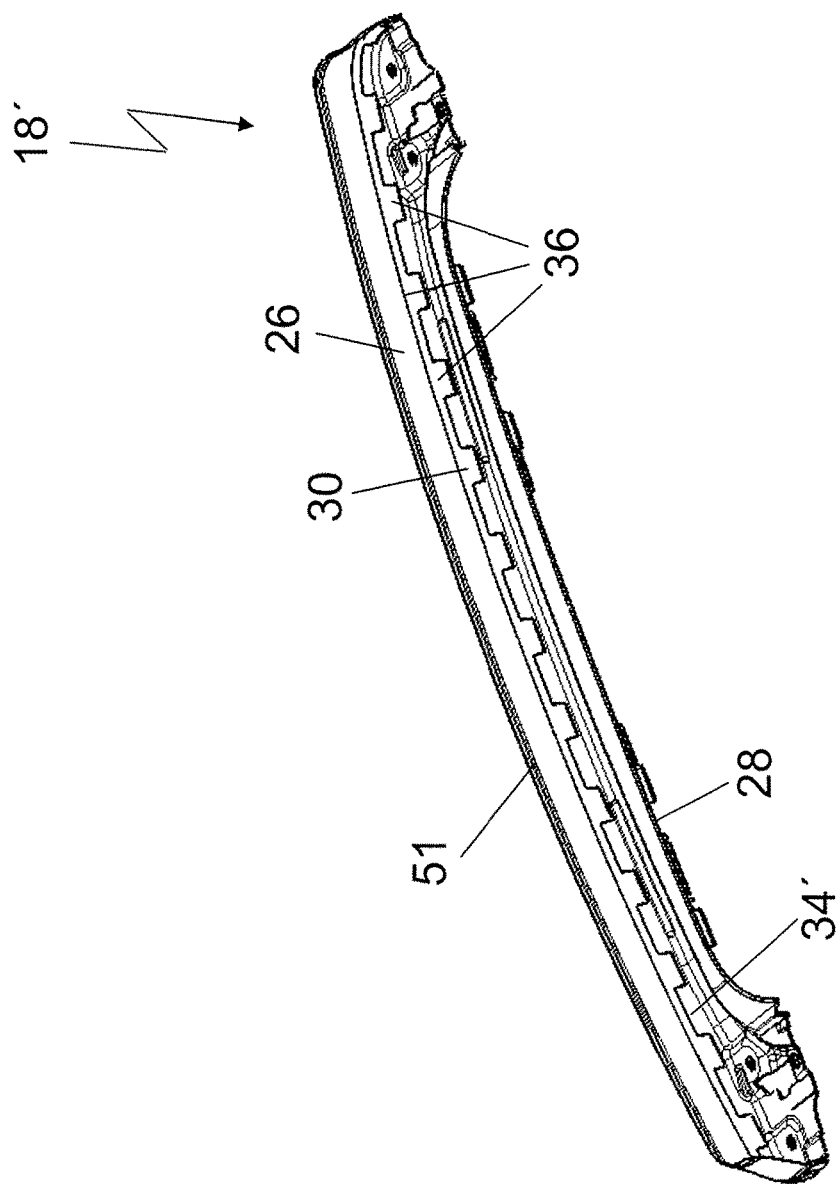
FIG. 10 shows a perspective view of an alternative embodiment of a wind deflector mesh that is attached to a wind deflector tray.
Figure 11:
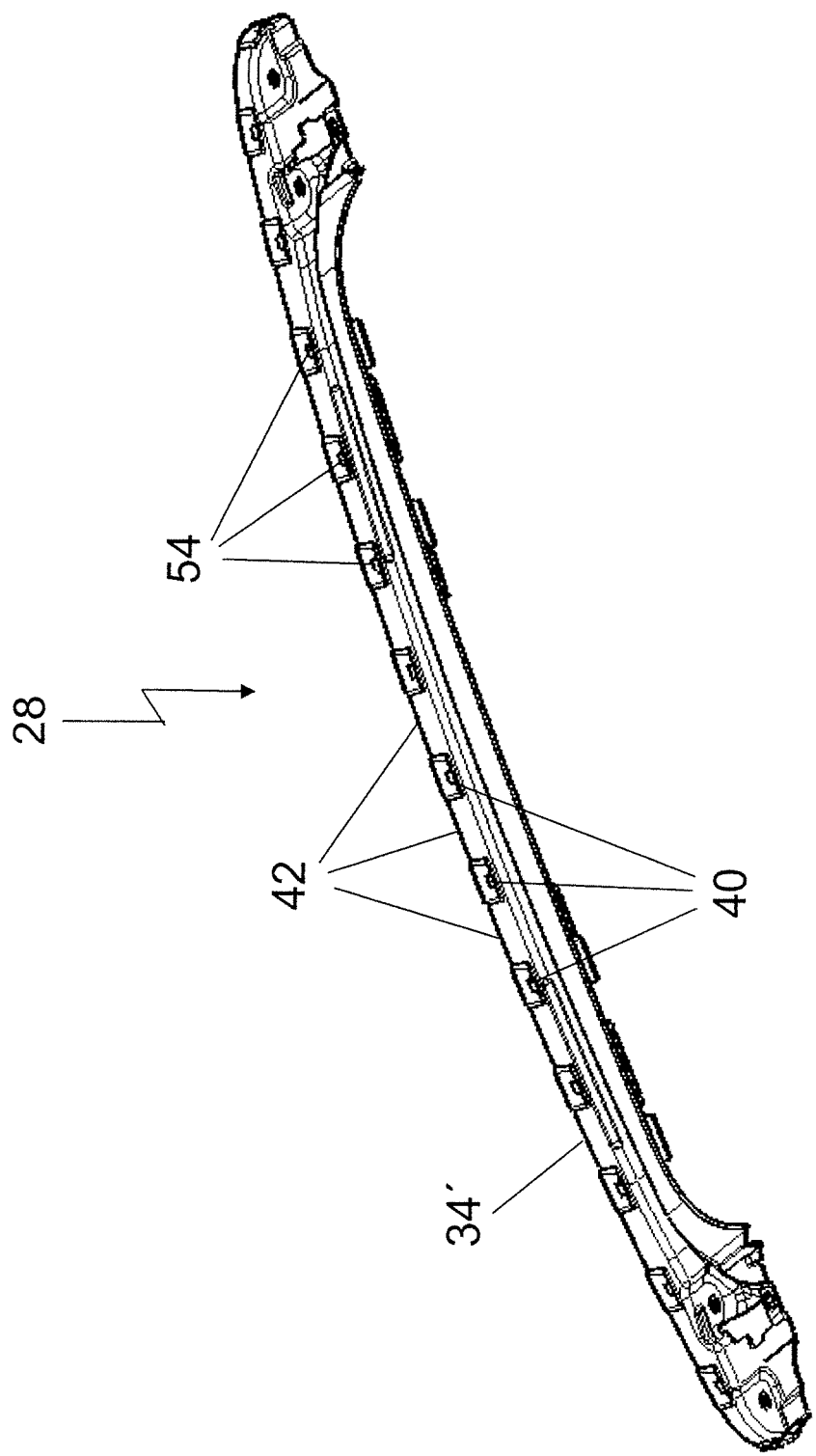
FIG. 11 shows the wind deflector tray of the alternative embodiment.
Figure 12:
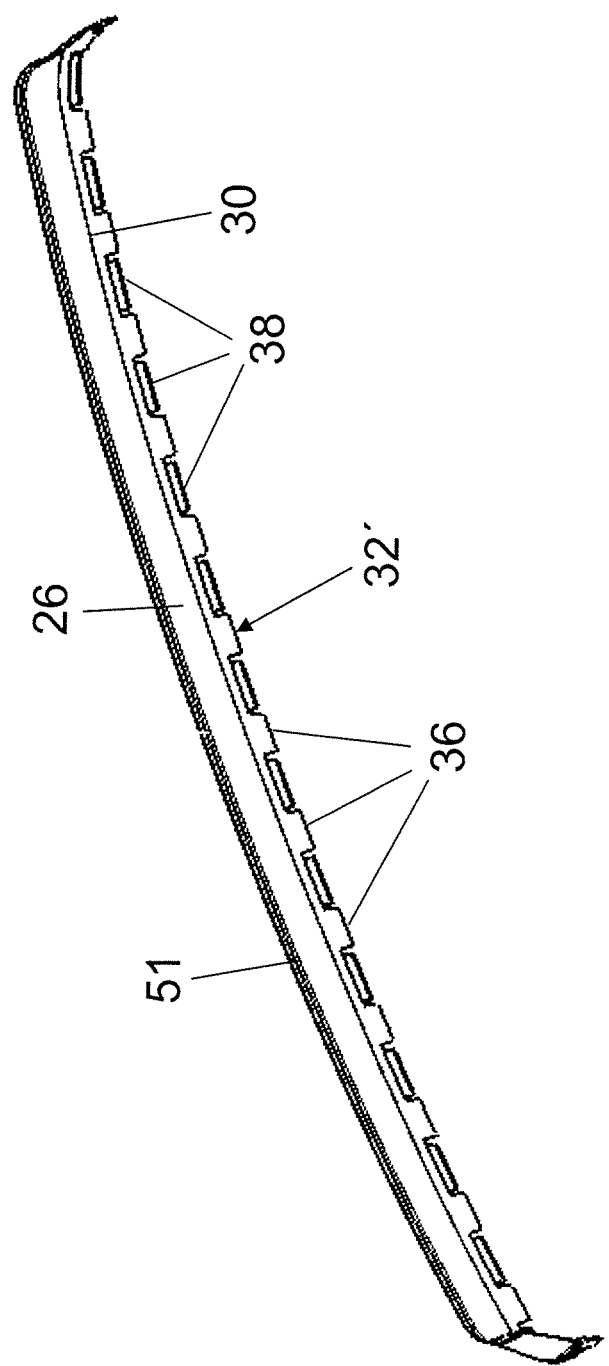
FIG. 12 shows the wind deflector mesh of the alternative embodiment.
Figure 13:
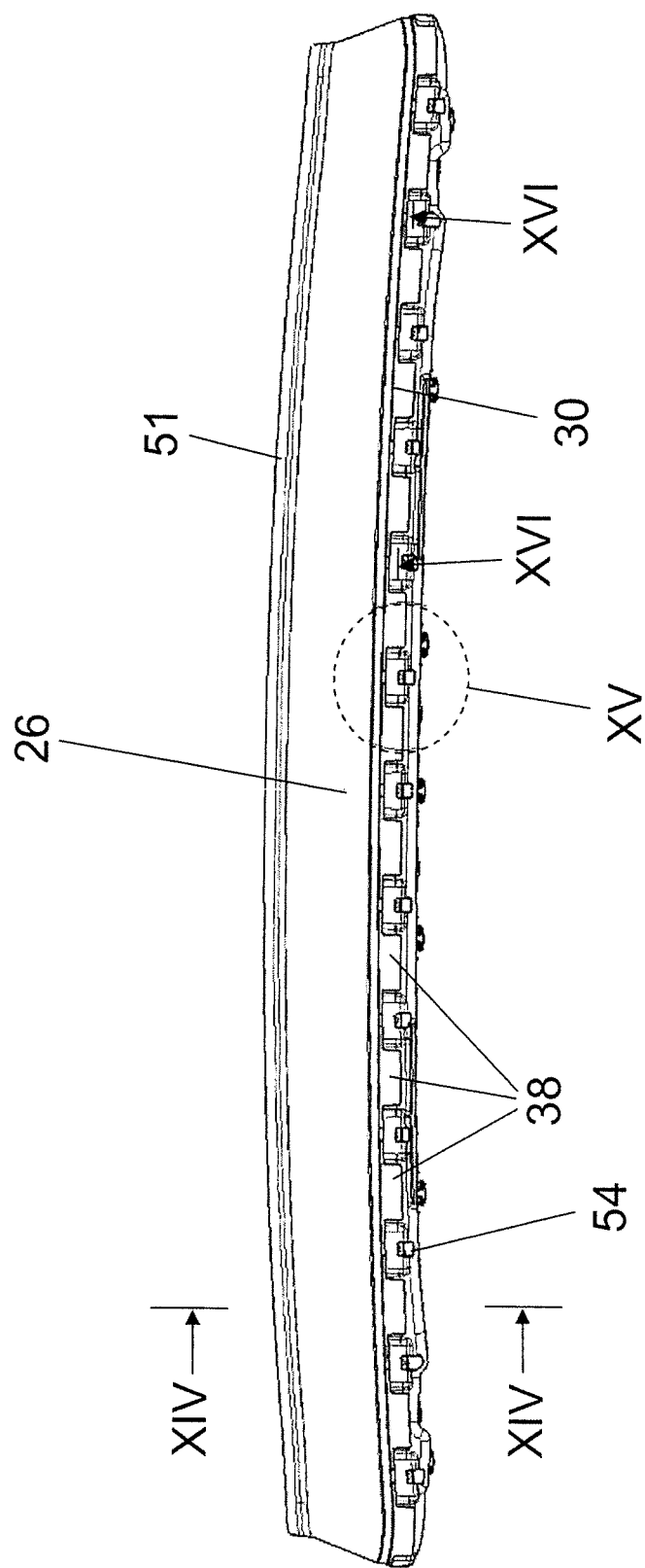
FIG. 13 shows a front view of the wind deflector tray and the wind deflector mesh.
Figure 14:
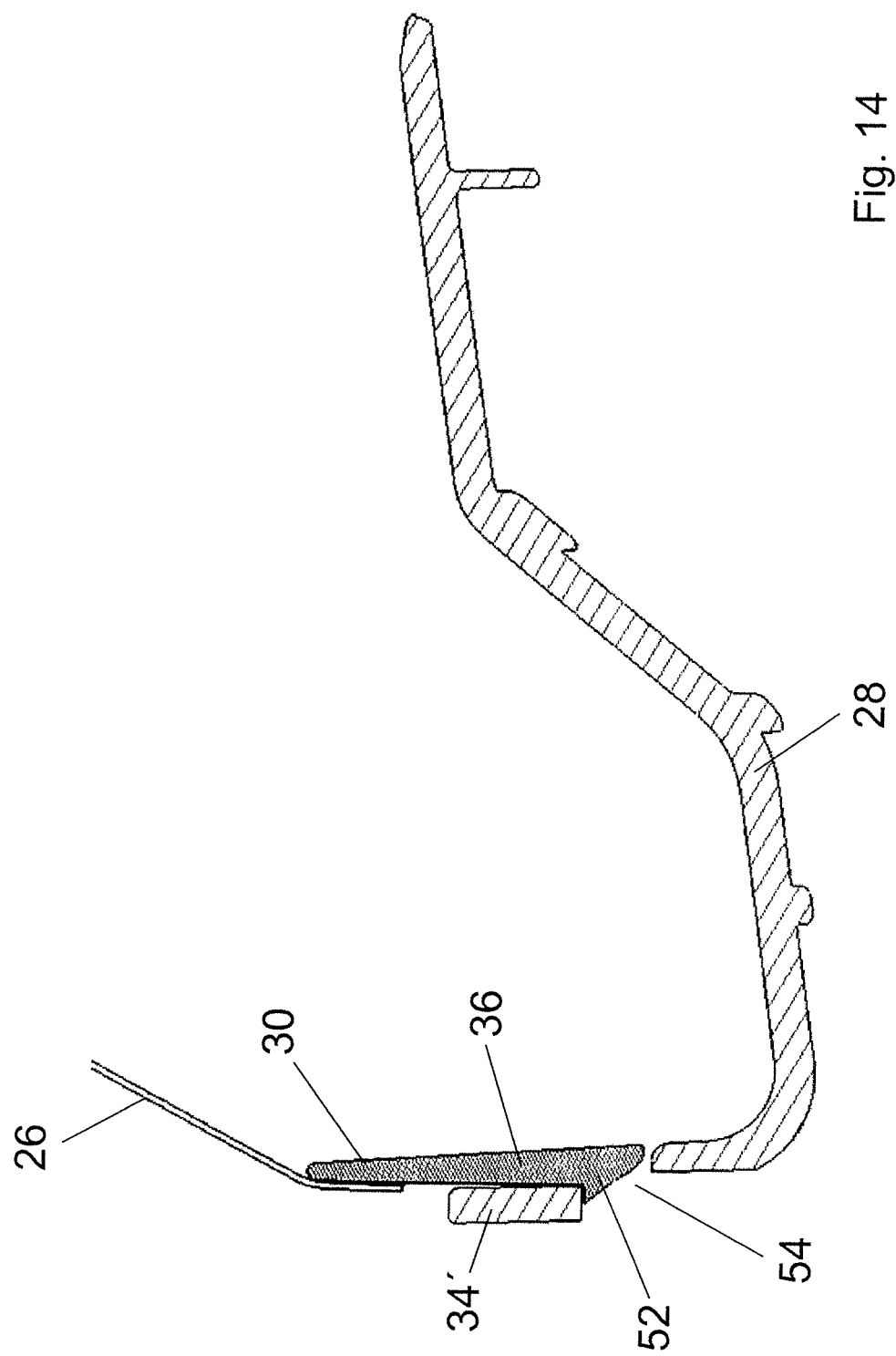
FIG. 14 shows a cross-section through the wind deflector mesh and the wind deflector tray along line XIV-XIV in FIG. 13.
Figure 15:
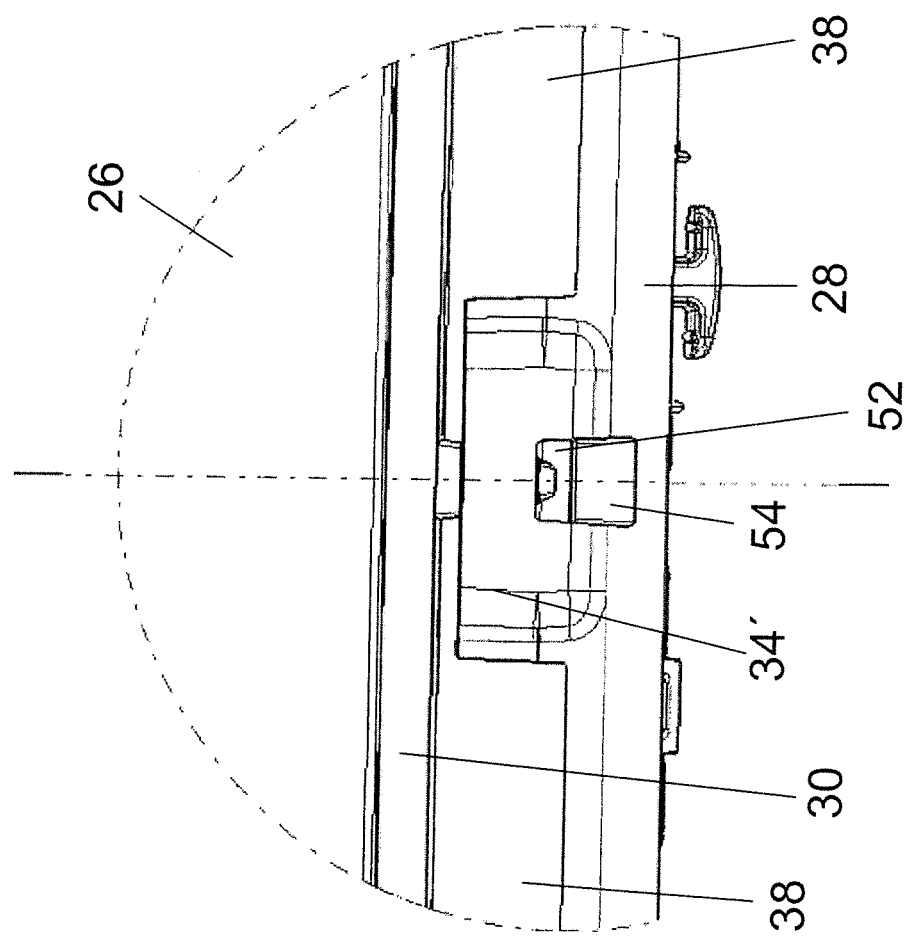
FIG. 15 shows an enlarged illustration of area XV in FIG. 13.
Figure 16:
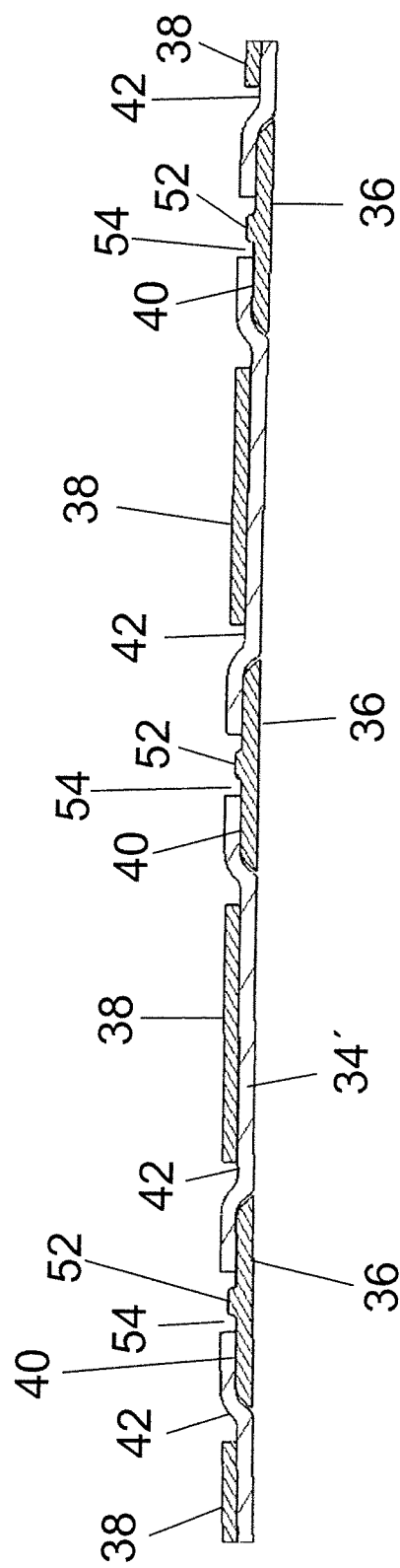
FIG. 16 shows a cross-section through the wind deflector mesh and the wind deflector tray along line XVI-XVI in FIG. 13.

The fixing rib 34 of the wind deflector tray 28 has seats 40 for the locking tabs 36 and seats 42 for the support tabs 38, said seats 40 and 42 alternating in the longitudinal direction of the fixing rib 34. The seats 40 and 42 are realized in that the fixing rib 34 is stepped in each of the areas between the seats 40 and 42, the fixing rib 34 thus, in the broadest sense, following the shape of a mathematical rectangular function or having a wave form in the longitudinal cross-section (FIG. 9). The depth of the seats 40 and 42 corresponds to the thickness of the locking tabs 36 and of the support tabs 38.

Figure 6:
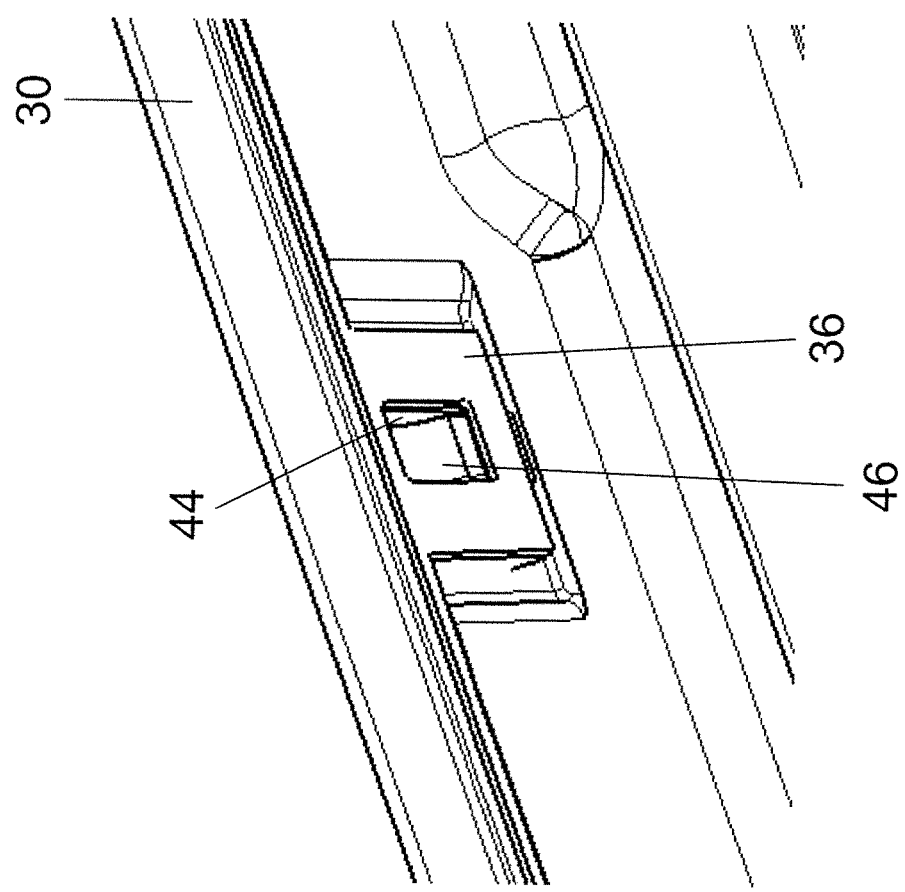
FIG. 6 shows an enlarged illustration of an area in which the wind deflector mesh is connected to the wind deflector tray.
Figure 7:
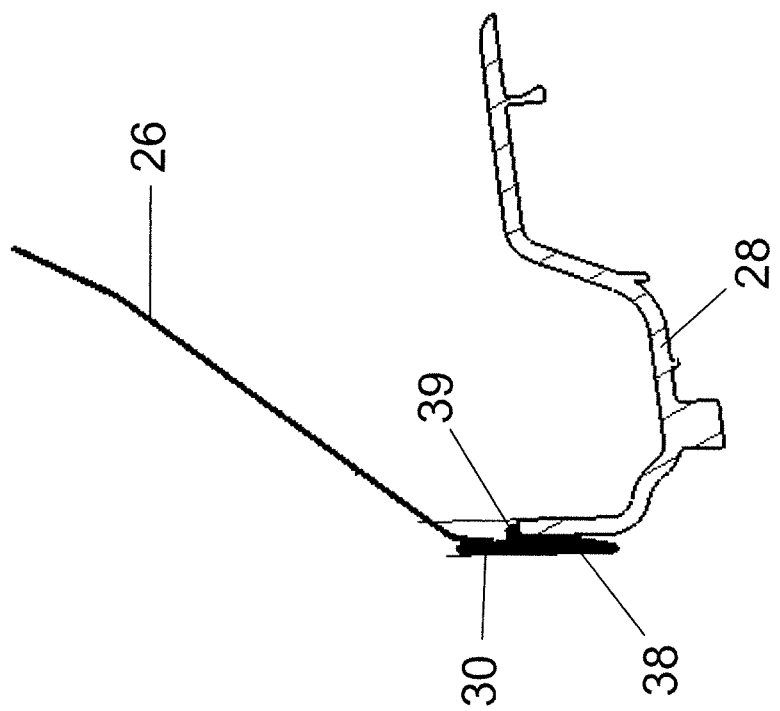
FIG. 7 shows a first cross-section through the wind deflector along line VII-VII in FIG. 3.
Figure 8:
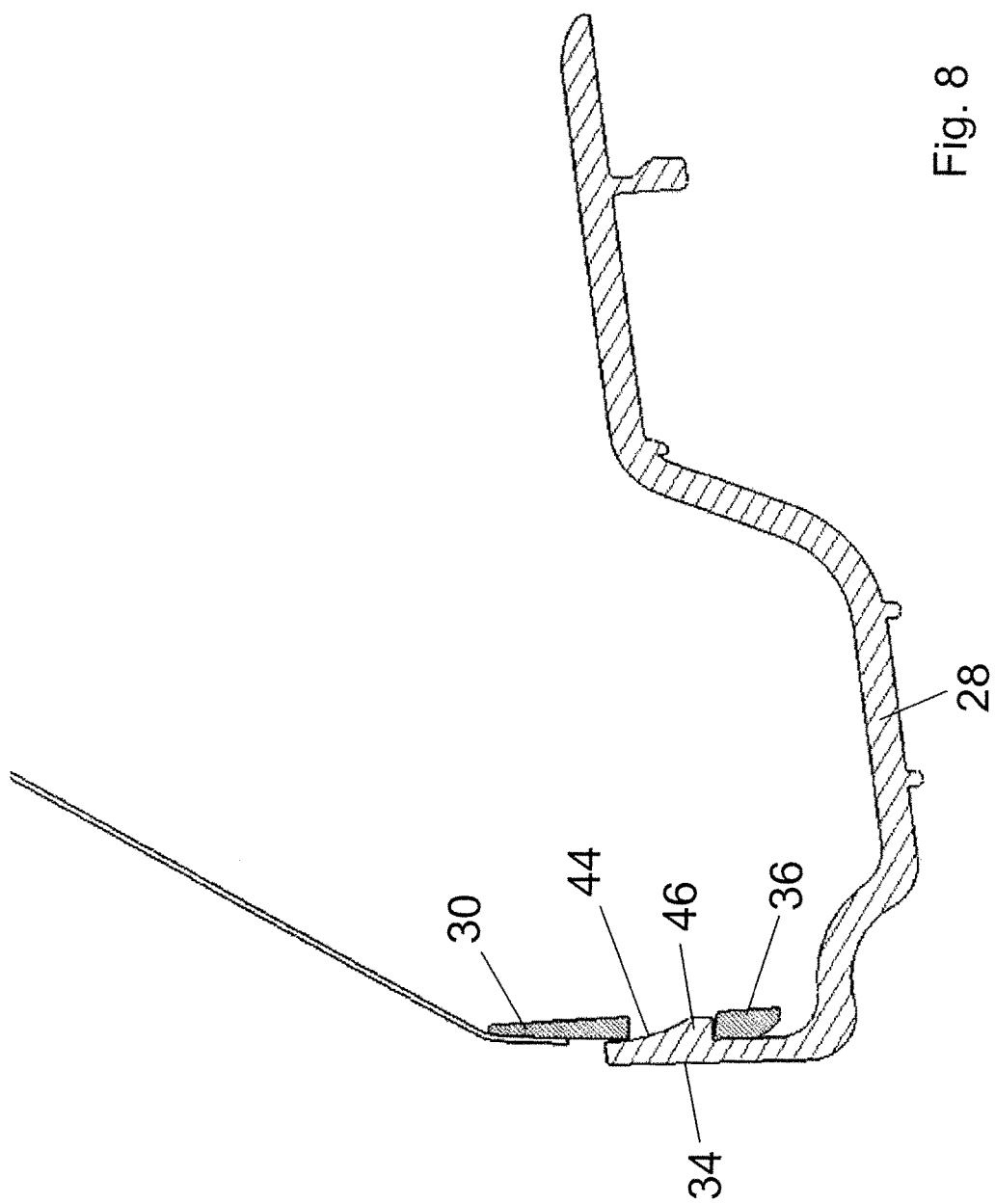
FIG. 8 shows a second cross-section through the wind deflector along line VIII-VIII in FIG. 3.

To be able to fix the edge strip 30 to the wind deflector tray 28, each locking tab 36 has a window-like locking opening 44 into which a respective locking nose 46 of the wind deflector tray 28 engages, said locking nose 46 having a substantially horizontal locking surface 48 at its underside and an entry slope 50 via which the respective locking tab 36 can slide into its locked position, which is illustrated in FIGS. 6 and 8.

The support tabs 38, which are each disposed in the corresponding seats 42 of the wind deflector tray 28 when in the installed position, engage the fixing rib 34 from the side facing away from the locking tabs 36. From one side the support tabs 38 are thus in contact with the fixing rib 34, whereas from the other side the locking tabs 36 are in contact with the fixing rib 34 of the wind deflector tray 28.

In order to clearly define the position of the edge strip 30 on the fixing rib 34 in the vertical direction, the edge strip 30 has a stop 39 for the upper front-end side of the fixing rib 34.

As can be seen in particular in FIG. 9, the thickness of the fastening system composed of the arrangement of tabs 32 and the fixing rib 34 for the deflector element 26 on the wind deflector tray 28 is defined by the material thickness of the fixing rib 34 and by the material thickness of the locking tabs 36 and of the support tabs 38, which are accommodated by the seats 40 and 42, whose depth corresponds to the material thickness of the locking tabs 36 and of the support tabs 38.

Furthermore, the deflector element 26 has an upper edge strip 51 that is formed like a beading and is accommodated by a beading channel of the deploying bow 20. Alternatively, it is also conceivable that, for forming a fastening system, the upper edge strip 51 is also provided with an arrangement of tabs that is formed similarly to the arrangement of tabs 32 of the lower edge strip 30 and interacts with a fixing rib that is formed at the underside of the deploying bow 20.

FIGS. 10 to 16 show an alternative embodiment of a wind deflector 18', which largely corresponds to the wind deflector described above but differs therefrom in that the lower edge strip 30, which is an injection-molded element, has an arrangement of tabs 32' comprising locking tabs 36 that have locking noses 52 on their sides facing toward a fixing rib 34' of the wind deflector tray 28, said locking noses 52 engaging into locking openings 54 formed as window-like cutouts in the area of recesses 42 for the locking tabs 36 on the fixing rib 34'.

Similar to the embodiment according to FIGS. 1 to 9, the fixing rib 34' also has seats 40 and 42 alternating in the longitudinal direction for the alternately formed locking tabs 36 and support tabs 38 of the deflector element 26. The fixing rib 34', too, has a longitudinal cross-section that follows a mathematical rectangular function in the broadest sense.

Otherwise, the wind deflector 18' according to FIGS. 10 to 16 corresponds to the wind deflector described in the context of FIGS. 1 to 9.

REFERENCE SIGNS 10 motor vehicle
12 vehicle roof
14 roof cutout
16 lid element
18 wind deflector
20 deploying bow
22A, 22B brackets and deploying arms
24 transverse bracket
26 deflector element
28 wind deflector tray
30 edge strip
32 arrangement of tabs
34 fixing rib
36 locking tab
38 support tap
39 stop
40 seat
42 seat
44 locking opening
46 locking nose
48 locking surface
50 entry slope
51 edge strip
52 locking nose
54 locking opening

The invention claimed is:

1. A wind deflector for a vehicle roof capable of being opened and having a displaceable cover element, the wind deflector, comprising: an unfoldable deflector element which is made of a flat flexible material and whose lower edge portion is connected to a vehicle-mounted base via a lower edge strip and whose upper edge portion is fastened to a pivotable deploying bow via an upper edge strip, the lower edge strip lower edge strip and the vehicle-mounted base and/or the upper edge strip and the deploying bow forming a respective fastening system, wherein the fastening system comprises a fixing rib on one side and an arrangement of tabs attached to the fixing rib on the other side, the arrangement of tabs being formed along the fixing rib by alternating locking tabs and support tabs, the locking tabs and the support tabs being in contact with the fixing rib on lateral sides of the fixing rib facing away from each other.

2. The wind deflector according to claim 1, wherein the fixing rib is disposed on the vehicle-mounted base and the arrangement of tabs is disposed on the lower edge strip of the deflector element.

3. The wind deflector according to claim 1, wherein each locking tab has a locking nose that engages into a respective corresponding locking opening of the fixing rib.

4. The wind deflector according to claim 1, wherein each locking tab has a locking opening that engages into a respective five corresponding locking nose of the fixing rib.

5. The wind deflector according to claim 1, wherein the fixing rib has seats for the locking tabs and for the support tabs that alternate in the longitudinal direction of the fixing rib.

6. The wind deflector according to claim 1, wherein each support tab is provided with a locking means that interacts with a corresponding locking element of the fixing rib.

* * * * *